United States Patent
Ikeda

(10) Patent No.: US 6,998,603 B2
(45) Date of Patent: Feb. 14, 2006

(54) IMAGE FORMING APPARATUS, OPTICAL WRITING DEVICE, AND CONTROLLING METHOD THEREOF

(75) Inventor: Yoshito Ikeda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 10/653,893

(22) Filed: Sep. 4, 2003

(65) Prior Publication Data

US 2004/0119003 A1    Jun. 24, 2004

(30) Foreign Application Priority Data

Sep. 5, 2002    (JP)    ............................. 2002-260518

(51) Int. Cl.
*H01J 3/14*    (2006.01)
*H01J 40/14*    (2006.01)
*H01J 5/16*    (2006.01)

(52) U.S. Cl. ...................... 250/234; 250/205; 358/494; 347/237

(58) Field of Classification Search ................. 250/205, 250/234; 347/132–133, 236, 237, 246–248, 347/234; 358/474, 481, 494; 346/107.1, 346/107.3
See application file for complete search history.

(56) References Cited

U.S. PATENT DOCUMENTS

| 4,933,549 A | | 6/1990 | Fujioka et al. | |
| 5,726,437 A | * | 3/1998 | Ashikaga et al. | ........... 250/205 |
| 5,883,731 A | * | 3/1999 | Kasai | ......................... 359/204 |
| 6,114,682 A | * | 9/2000 | Minakuchi et al. | ......... 250/205 |
| 6,246,463 B1 | | 6/2001 | Hamada et al. | |
| 6,566,641 B1 | * | 5/2003 | Suda | ......................... 250/205 |
| 6,654,042 B1 | | 11/2003 | Ikeda | |

FOREIGN PATENT DOCUMENTS

JP    10-166649    6/1998

* cited by examiner

*Primary Examiner*—David Porta
*Assistant Examiner*—Patrick J. Lee
(74) *Attorney, Agent, or Firm*—Oblon, Spivak, McClelland, Maier & Neustadt, P.C.

(57) ABSTRACT

An image forming apparatus is disclosed that is capable of making it simple to initialize a laser system thereof. The image forming apparatus includes a first photo detector that detects a part of a laser beam from each of the lasers and generates respective power adjustment signals for the lasers, a second photo detector that detects another part of the scanning laser beam of each of the lasers and generates a synchronization signal corresponding to each laser, and a power adjustment control unit that changes the output power of each of the lasers to a predetermined value. During the adjustment of output powers of the lasers, the power of a laser is monitored by using the synchronization signal. The power adjustment control unit turns on a laser for power adjustment, and turns off the laser when the scanning synchronization signal is detected twice to complete the power adjustment of the laser, and then starts power adjustment of the next laser.

8 Claims, 5 Drawing Sheets

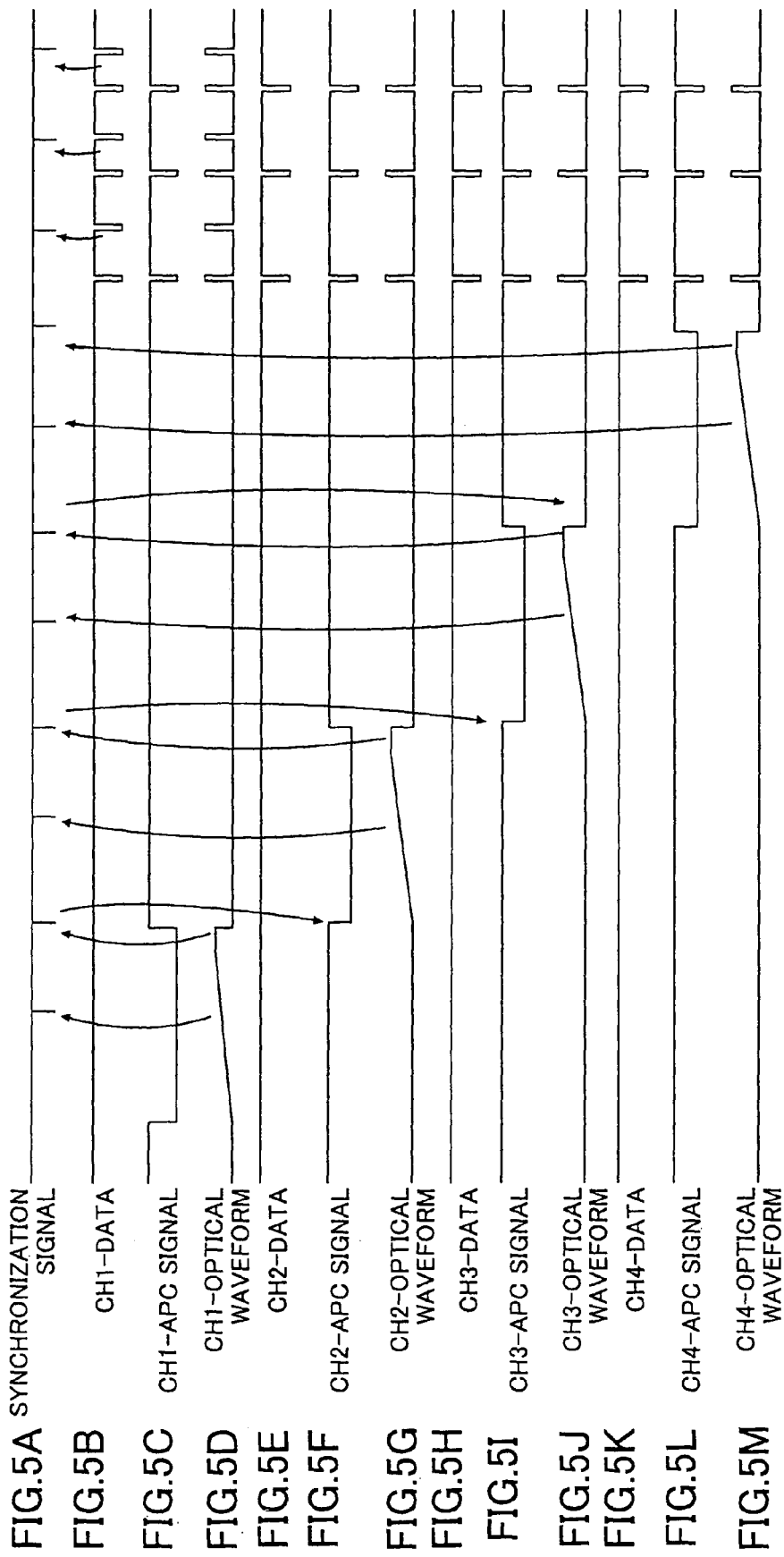

IMAGE FORMING APPARATUS, OPTICAL WRITING DEVICE, AND CONTROLLING METHOD THEREOF

BACKGROUND OF THE INVENTION

1. Field of the Invention

The present invention relates to an optical writing device that includes a plurality of semiconductor lasers and is capable of adjusting amounts of the laser beams by using a photo sensing element, a controlling method thereof, and an image forming apparatus including the optical writing device.

2. Description of the Related Art

In the related art, a conventional image forming apparatus equipped with an optical writing device has a laser chip including a light emitting element and a photo sensing element (for example, a photo diode), and a semiconductor laser controller including an optical negative feed back loop for control of the laser chip. In order to increase printing speed and image quality of the image forming apparatus, a number of laser chips and the same number of laser controllers are provided in the image forming apparatus.

To increase the printing speed and image quality, a laser chip is proposed which includes a number of light emitting elements arranged in a matrix manner, forming a light emitting element array.

When using the light emitting element array including a number of light emitting elements arranged in a matrix manner in a laser chip, because there is only one photo sensing element commonly used by the light emitting elements, it is difficult to perform an APC (Auto Power Control) operation for the light emitting elements at the same time. As a result, it is difficult to apply the APC pull-in technique of the related art directly to the light emitting element array configuration used in a multi-beam writing device.

In the image forming apparatus of the related art, for example, as disclosed in Japanese Laid Open Patent Application, No. 10-166649, which discloses a method of APC pull-in process suitable for a multi-beam writing device, any one of the light emitting elements can be used to generate laser beams to successively generate synchronization signals. In synchronization with the synchronization signals, the powers (or, the amount of light emitted from a light emitting element) of other light emitting elements are adjusted to a desired value.

However, in the image forming apparatus disclosed in Japanese Laid Open Patent Application, No. 10-166649, when a light emitting element is turned on to generate a synchronization signal, adjustments of other light emitting elements have to be interrupted, and the adjustments have to be monitored constantly.

SUMMARY OF THE INVENTION

It is a general object of the present invention to solve one or more problems of the related art.

According to the present invention, when the output power of one of the lasers changes (for example, increase), the change of the output power of the laser can be monitored by using the synchronization signal. Specifically, the control unit determines that the output power of the laser under adjustment reaches the predetermined value when the synchronization signal is detected. This scheme makes it easy to monitor the output powers of the lasers during adjustment, and still ensures sufficiently reliable power adjustment up to the line APC process.

According to the present invention, the control unit adjusts the output powers of the lasers to be the desired value one by one, that is, after completion of adjustment of one laser, start adjustment of the next laser. Further, during the adjustment of one laser, the control unit monitors the output power of the laser using the synchronization signal generated by the laser under adjustment itself, but not by any other lasers. Specifically, the control unit stops the power adjustment when the synchronization signal is detected twice. Therefore, this scheme makes it simple to initialize the laser array, and makes the time for initializing the laser array short. Further, it is not necessary to stop the power adjustment of any lasers in order to generate a synchronization signal during the adjustment, making the initialization of the image forming apparatus smoothly.

According to the present invention, the number of the lasers that need to be adjusted can be appropriately changed. As a result, it is possible to make the initialization operation suitable to the system configuration.

These and other objects, features, and advantages of the present invention will become more apparent from the following detailed description of preferred embodiments given with reference to the accompanying drawings.

BRIEF DESCRIPTION OF THE DRAWINGS

FIGS. 5A through 5M are timing charts showing the operations from the synchronization detection to the line APC operation in the present invention.

DESCRIPTION OF THE PREFERRED EMBODIMENTS

Below, preferred embodiments of the present invention are explained with reference to the accompanying drawings.

In the following descriptions of embodiments of the present invention, the image forming apparatus includes a photo sensing element for detecting laser beams emitted from a number of semiconductor lasers, a number of semiconductor laser control circuits each of which has an optical negative feed back loop for controlling a forward current of the corresponding semiconductor laser so as to make an electric signal obtained by converting the laser beam emitted from the corresponding semiconductor laser and detected by the photo sensing element equal to that of a light emitting level designating signal, and an APC (Auto Power Control) timing determination unit for determining the timing of the APC operations of the semiconductor laser control circuits.

Figure 1:
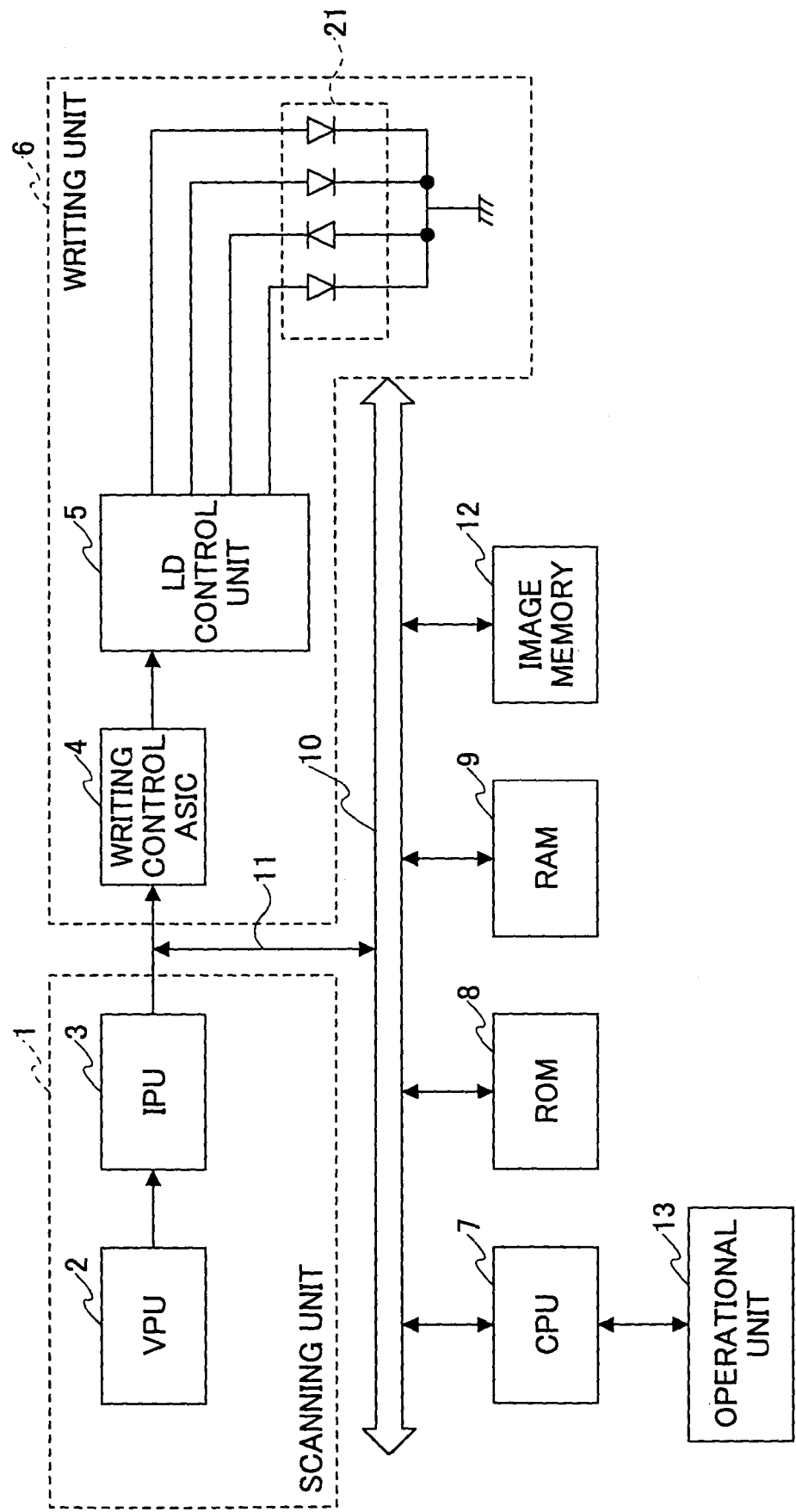
FIG. 1 is a block diagram showing a schematic configuration of an image forming apparatus according to an embodiment of the present invention.

FIG. 1 is a block diagram showing a schematic configuration of an image forming apparatus according to an embodiment of the present invention.

The image forming apparatus shown in FIG. 1 includes a scanning unit 1 for reading in data of an original image, and a writing unit 6 for printing the image read by the scanning unit 1 on a medium.

The scanning unit 1 includes a VPU 2 for converting the input analogue signals corresponding to the original image into digital signals and for performing black offset correction, shading correction, and image position correction, and an IPU 3 performing image processing.

The writing unit 6 includes a laser diode (LD) array 21 for forming static latent images on a photo-conducting drum, an LD control unit 5 for controlling the LD array 21, and a writing control ASIC (Application Specific Integrated Circuit) 4 for controlling the writing unit 6. Additionally, the image forming apparatus includes a CPU 7 for controlling the image forming apparatus, a ROM 8 in which control programs are stored, a RAM 9 for temporary use of the control programs, an internal system bus 10 for exchanging data between different parts in the image forming apparatus, an interface (I/F) 11 between the system bus 10 and the IPU 3, an image memory 12 for storing the image read by the scanning unit 1, and an operational unit 13 by which an operator inputs commands.

Figure 2:
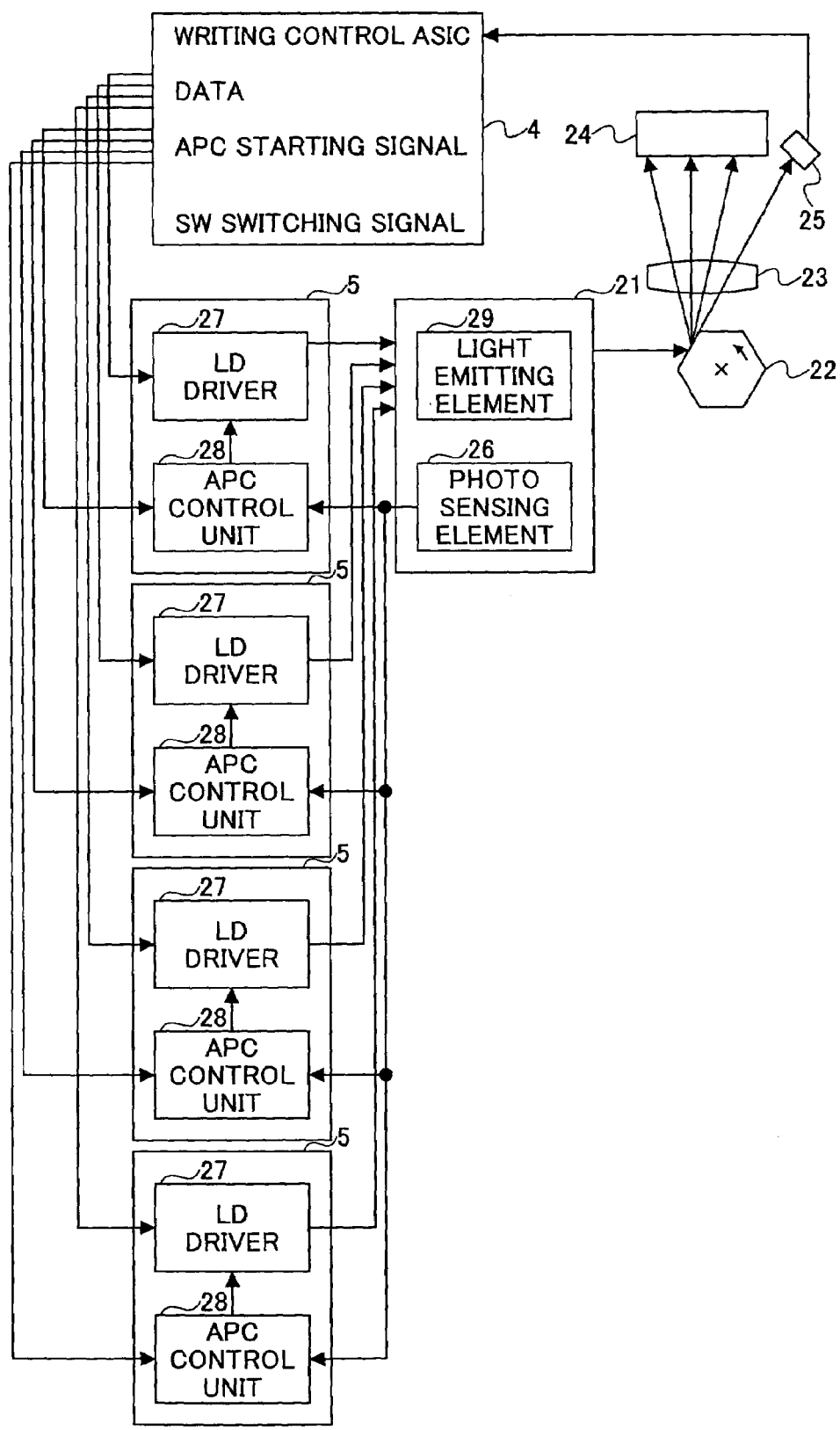
FIG. 2 is a block diagram of a controlling portion of the writing unit 6, and a schematic view of a portion of the optical system of the writing unit 6.

FIG. 2 shows the writing control ASIC 4 and the LD control unit 5, and a portion of an optical system of the writing unit 6. Shown in FIG. 2 are the writing control ASIC 4, a number of LD control units 5, the LD array 21, a deflector 22 formed by a rotating polygon mirror, an fθ lens 23, a photo-conducting drum 24, and a photo detector 25. The LD array 21 includes a photo sensing element 26 and a number of light emitting elements 29. Each of the LD control units 5 includes an LD driver 27 and an APC control unit 28.

The LD array 21 emits multiple laser beams in a forward direction. The laser beams are collimated by a not-illustrated collimator lens, deflected by the deflector 22, and are shaped by the fθ lens 23 to form image spots on the photo-conducting drum 24 which is uniformly charged by a charger. Due to the rotation of the deflector 22, the image spots on the photo-conducting drum 24 scan from side to side repeatedly along the axial direction of the photo-conducting drum 24 (this direction is referred to as the main scan direction). At the same time, the photo-conducting drum 24 is rotating, making the image spots move on the photo-conducting drum 24 along the rotating direction of the photo-conducting drum 24 (this direction is referred to as the sub scan direction).

The photo detector 25 is arranged out of the laser scanning region to detect the laser beams deflected by the deflector 22 so as to generate a synchronization signal. The writing control ASIC 4 applies an image signal to the LD drivers 27 in the semiconductor laser control units 5, and the timing of applying an image signal to the LD drivers 27 is controlled by the synchronization signal generated by the photo detector 25.

The LD drivers 27 drive the LD array 21 to form a static latent image on the photo-conducting drum 24. The static latent image is developed by a developer and is transferred to a paper by a transferring unit.

Each of the light emitting elements 29 in the LD array 21 also emits a laser beam in the backward direction. Each of these laser beams are detected by the photo sensing element 26, and the photo sensing element 26 determines the strength of the incident laser (or power of the corresponding laser). The signal generated by the photo sensing element 26 corresponding to the power of the laser is input to APC controller 28 corresponding to the light emitting element 29 that emits the laser beam.

The APC controller 28 controls the LD drivers 27 according to the output signal from the photo sensing element 26 to make the output power of the light emitting element 29 in the LD array 21 equal to a desired value. Specifically, the power supply of the light emitting element 29 in the LD array 21 is adjusted according to the signal from the photo sensing element 26 so as to the output power of the light emitting element 29 is equal to the desired value. Then the resultant status of the power supply is maintained.

The output powers of the other light emitting elements 29 are also adjusted in the same way by using the photo sensing element 26 so that the output powers of all the light emitting elements 29 equal to the desired value.

Figure 3:
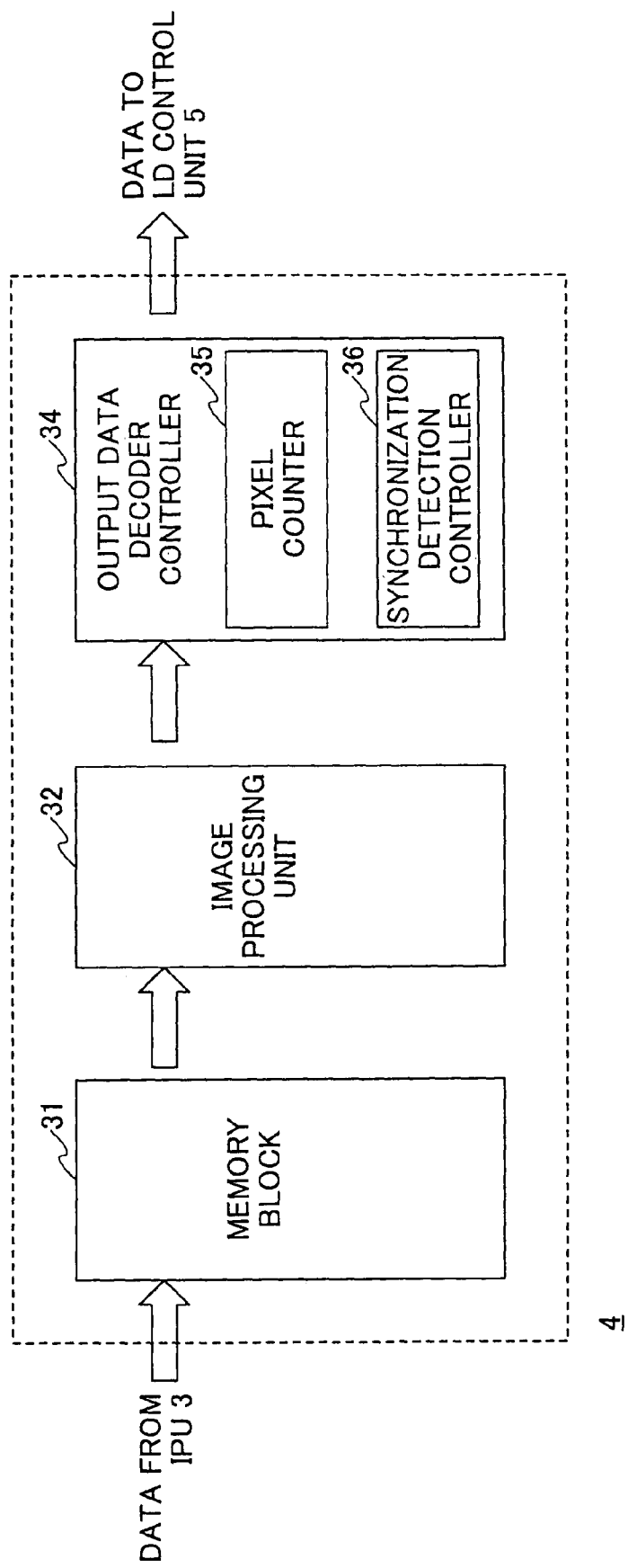
FIG. 3 is a schematic view showing a configuration of the writing control ASIC 4.

FIG. 3 is a schematic view showing a configuration of the writing control ASIC 4.

As shown in FIG. 3, the writing control ASIC 4 includes a memory block 31 for converting the speed and the format of the image data from the IPU 3, a unit 32 for processing the image data from the memory block 31, and an output data decoder controller 34 for performing γ transformation on the image data, assignment of P sensor pattern, and so on. Additionally, the output data decoder controller 34 includes an pixel counter 35 for counting the numbers of the light emitting dots of the laser diodes, and a synchronization detection controller 36.

Figure 4:
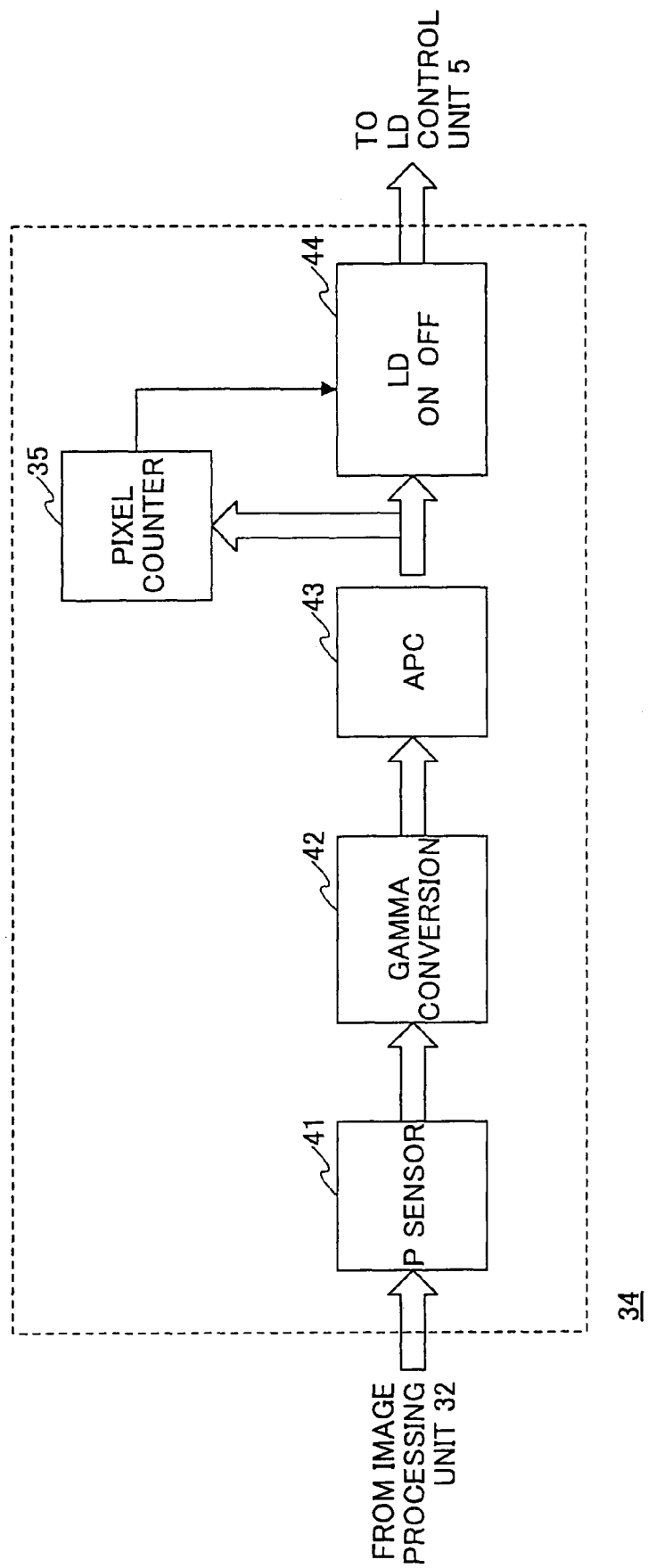
FIG. 4 is a block diagram showing a configuration of the output data decoder controller 34 of the writing control ASIC 4.

FIG. 4 is a block diagram showing a configuration of the output data decoder controller 34 of the writing control ASIC 4.

The output data decoder controller 34 includes a P pattern block 41, a γ transformation block 42, an APC block 43, and an LD ON/OFF block 44.

The P pattern block 41 extracts data determining process conditions from the data input from the image processing unit 32, and assigns a P sensor pattern for adding toner at a certain density to the photo-conducting drum 24. The y transformation block 42 changes weight factors of data. The APC block 43 outputs image data in synchronization with the timing of APC operations for maintaining output powers of the laser diodes to be constant. The LD ON/OFF block 44 provides light emitting data for synchronization detection.

FIGS. 5A through 5M are timing charts showing the operations from the synchronization detection to a line APC operation in the present embodiment, illustrating the initialization operations of the laser diode array 21.

As shown in FIGS. 5A through 5D, the laser diode of channel 1 is turned on and initialization of APC (or referred to as "an APC initialization operation" or "an APC pull-in operation") starts. The laser beam from the laser diode of channel 1 is deflected by the deflector 22 and scans the photo-conducting drum 24. Each time the laser beam is detected by the photo detector 25 located in the scanning plane of the laser beam, a synchronization signal is generated.

In the present embodiment, when a synchronization signal is generated twice, the laser diode of channel 1 is turned off, completing the APC initialization operation of channel 1. As shown in FIGS. 5E through 5G, after channel 1 is turned off, channel 2 is turned on, and similarly, when a synchronization signal is generated twice, the laser diode of channel 2 is turned off.

This operation is repeated for all channels (FIGS. 5H through 5M show the APC operations for channel 3 and channel 4), and when a synchronization signal for the laser diode of the last channel is generated twice, the line APC operation, which is for maintaining the output powers of the laser diodes starts in synchronization with the synchronization signal generated by channel 1.

In the present embodiment, for each main scan operation, the laser diodes of four channels are used for writing. Therefore, in the APC initialization operation, first, after the power of the image forming apparatus is turned on, the deflector 22 is rotated, and channel 1 is turned on, and the power of the laser diode of channel 1 is adjusted. When the power of channel 1 is greater than a preset level, the photo detector 25 detects the laser beam and outputs a first synchronization signal. Next, channel 1 is kept to be turned on, and when a second synchronization signal is generated, channel 1 is turned off, and the laser diode in channel 2 is turned on.

Similarly, when the power of channel 2 is greater than the preset level, the photo detector 25 detects the laser beam and outputs a synchronization signal. Next, channel 2 is kept to be turned on compulsorily, and when the second synchronization signal is generated, channel 2 is turned off, and the laser diode in channel 3 is turned on.

For channel 3 and channel 4, the same operations are repeated, and the respective synchronization signals are obtained. When a synchronization signal for the last channel is generated twice, the operation for adjusting the output powers of the laser diodes to the aforementioned desired value (that is, the APC initialization operation) is completed. Then the line APC operation for maintaining the output powers of the laser diodes to the desired values starts. Specifically, while the synchronization signal is generated by channel 1, the line APC operation starts in synchronization with the synchronization signal.

In the present embodiment, timing of the line APC operation is determined by using a main scan counter that performs counting using a writing clock signal. For example, a value is preset for the main scan counter, and other signals are started or stopped when counts of the main scan counter reach this preset value. By comparing counts of these signals with this preset value, a gate signal is output. The preset value may be modified by using, for example, a SP mode, which is capable of modifying various setting data. By using the SP mode, it is also possible to set how many channels of LDs should be adjusted before transferring to the line APC operation, and as a result, it is possible to make the initiation of the LD array suitable to the configuration of the image forming apparatus.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effects of the present invention, during an APC initialization operation for adjusting output powers of lasers in a laser array, the output powers of the lasers are monitored using the synchronization signal. This makes it easy to monitor the output powers of the lasers. Further, the adjustments of changing the output powers of lasers to the desired value are made sequentially, and therefore, it is possible to make the time for initializing the laser array short. In addition, the power adjustment is completed when the synchronization signal is detected twice. Therefore, it is not necessary to stop the power adjustment when a synchronization signal is generated, making the initialization of the image forming apparatus smoothly. Further, the number of lasers that need to be adjusted can be appropriately changed. As a result, it is possible to make the initialization operation suitable to a configuration of the image forming apparatus.

This patent application is based on Japanese Priority Patent Application No. 2002-260518 filed on Sep. 5, 2002, the entire contents of which are hereby incorporated by reference.

What is claimed is:

1. A power control method of initializing a power control process in an image forming apparatus by maintaining power of a plurality of lasers at a predetermined value based on detected powers of the plurality of lasers, comprising:
    switching on a first laser of the plurality of lasers, a power of the first laser continuously changing to the predetermined value after being switched on;
    switching off the first laser when a synchronization signal is generated, said synchronization signal being generated each time the laser beam from the first laser is detected, said laser beam configured to scan a scanning surface in the image forming apparatus;
    repeating the switching on and the switching off for each of the plurality of lasers, individually, so that powers of all the lasers change to the predetermined value; and
    maintaining the powers of each of the plurality of lasers, one by one, to be the predetermined value based on the detected powers of each of the plurality of lasers in synchronization with a synchronization signal generated by each respective laser.

2. The method of claim 1, wherein the switching off one of the plurality of lasers further comprises:
    switching off one of the plurality of lasers when the synchronization signal generated from the one of the plurality of lasers is output twice.

3. The method of claim 1, wherein
    a number of the plurality of lasers whose output powers are to be controlled is adjustable.

4. An optical writing device; comprising:
    a plurality of lasers each configured to emit a laser beam to scan a scanning surface;
    a first photodetector configured to detect a power of each of the plurality of lasers;
    a controller configured to perform a power control process to maintain the powers of the each of the plurality of lasers at a predetermined value based on said detected powers of each of the plurality lasers;
    a second photodetector configured to detect the laser beam from each of the plurality of lasers and output a synchronization signal each time the second photodetector detects a scanning laser beam; and
    a power adjustment control unit configured to control an initialization process to the power control process so that the powers of each of the of the plurality of lasers change to the predetermined value before the power control process starts,
    wherein the power adjustment control unit is further configured to switch on a first of the plurality of lasers rendering the power of the first laser to continuously change to the predetermined value after being switched on, and the power adjustment control unit switches off the first laser when a scanning synchronization signal generated from the first laser is detected, and the switching on and the switching off is repeated for each of the plurality of lasers, individually, so that powers of all lasers change to the predetermined value.

5. The optical writing device as claimed in claim 4, wherein
the power adjustment control unit is configured to switch off one of the plurality of lasers that is on when the synchronization signal generated from the laser that is on is output twice.

6. The optical writing device as claimed in claim 4, wherein
a number of the plurality of lasers adjustable by the control unit is changeable.

7. An image forming apparatus, comprising:
an optical writing device, comprising
  a plurality of lasers each configured to emit a laser beam to scan a scanning surface;
  a first photodetector configured to detect a power of each of the plurality of lasers;
  a controller configured to perform a power control process to maintain the powers of the each of the plurality of lasers at a predetermined value based on said detected powers of each of the plurality of lasers; and
  a second photodetector configured to detect the laser beam from each of the plurality of lasers and output a synchronization signal each time the second photodetector detects a scanning laser beam; and
  a power adjustment control unit configured to control an initialization process to the power control process so that the powers of each of the of the plurality of lasers change to the predetermined value before the power control process starts,
  wherein the power adjustment control unit is further configured to switch on a first of the plurality of lasers rendering the power of the first laser to continuously change to the predetermined value after being switched on, and the power adjustment control unit switches off the first laser when a scanning synchronization signal generated from the first laser is detected, and the switching on and the switching off is repeated for each of the plurality of lasers, individually, so that powers of all lasers change to the predetermined value.

8. An optical writing device, comprising:
a plurality of lasers, each of the plurality of lasers emitting a laser beam to scan a scanning surface;
means for detecting a power of each of the plurality of lasers and performing a power control process based on said detected powers of the lasers to maintain the powers of the lasers to be a predetermined value;
means for detecting the laser beam from each of the plurality of lasers while the laser beam is scanning the scanning surface;
means for outputting a synchronization signal each time the means for detecting the laser beam detects the scanning laser beam; and
means for controlling an initialization process to a power control process so that the powers of each of the plurality of lasers change to the predetermined value before the power control process starts,
wherein the means for controlling an initialization process switches on a first laser of the plurality of lasers and the power of first laser continuously changes to the predetermined value after being switched on, and the means for controlling an initialization process switches off the first laser when a scanning synchronization signal generated from the one of the plurality of lasers that is on is detected,
wherein the switching on and the switching off is performed for each of the plurality of lasers, individually, so that powers of all lasers change to the predetermined value.

* * * * *